Dec. 13, 1932.   J. J. POMERANZ ET AL   1,891,176
JOINT FOR THE EYE WIRES OF OPHTHALMIC MOUNTINGS
Filed July 1, 1931

INVENTORS
Jacob J. Pomeranz
BY Vincent Tanasso
ATTORNEYS

WITNESSES

Patented Dec. 13, 1932

1,891,176

UNITED STATES PATENT OFFICE

JACOB J. POMERANZ, OF BROOKLYN, AND VINCENT TANASSO, OF HARRISON, NEW YORK

JOINT FOR THE EYE-WIRES OF OPHTHALMIC MOUNTINGS

Application filed July 1, 1931. Serial No. 548,180.

This invention relates to ophthalmic mountings, and refers more particularly to an improved joint for connnecting the ends of eye-wires, and which improvement is applicable to the screw tube joints of Oxford or eyeglass frames, the end pieces of spectacle frames or the like.

In so far as is known, eye-wire joints have heretofore invariably consisted of mating screw receiving elements having abutting relation with the headed end of the connecting screw freely extending through one of said elements and having threaded anchorage in the other element.

In order to improve joints of this nature, the present invention comprehends the formation of an extension on that element of the joint within which the screw is threadedly anchored, which extension is designed to telescopically fit within the other element so as to act as an aligning guide for maintaining the ends of the eye-wire in proper juxtaposition while the same is circumferentially expanded, to afford a more secure joint, to provide a longer threaded engagement for the screw and to relieve the screw of strains and stresses.

Other objects of the invention reside in the comparative simplicity of construction of the joint, the economy with which the same may be produced and the general efficiency derived therefrom.

With the above recited and other objects in view, reference is had to the following description and accompanying drawing, in which there are exhibited several examples or embodiments of the invention, while the claims define the actual scope of the same.

In the drawing:

Figure 1 is a collective perspective view illustrating the joint completely separated and the retaining screw removed.

Figure 2 is a longitudinal sectional view through the joint, illustrating the same in the fully connected condition.

Figure 3 is a similar view illustrating the joint partially separated.

Figure 4 is a fragmentary sectional view illustrating a different application of the joint.

Figure 5 is a longitudinal sectional view through a joint showing a modified adaptation of the invention.

Figure 6 is a transverse sectional view taken approximately on the line 6—6 of Figure 5.

Referring to the drawing by characters of reference, 10 and 11 designate respectively the opposite ends of the eye-wire of an Oxford frame, which in the present instance is provided with the screw tube joint sections 12 and 13, in which the latter is provided with a portion or extension 14 of reduced diameter which protrudes from the end 15 of the main body 13 of said section which confronts and abuts with the end 16 of the section 12. The external diameter of the extension or portion 14 is of a size to snugly fit within the bore 17 of the section 12 but is of lesser length than the length of the section 12. In practice, the section 13 and its extension 14 may be formed integral or as separate nested pieces properly secured together. The section 13 has a threaded bore 18 extending axially therethrough and through the extension 14 for receiving the threaded shank 19 of a retaining screw having the usual kerfed head 20, which head is of a size to bear against the outer end of the section 12 for the purpose of drawing the sections 12 and 13 together. It is, of course, obvious that if desired, the head 20 of the screw may be countersunk in the end of the section 12.

In the modified form of the invention illustrated in Figure 4, the opposite ends 21 and 22 of the eye-wire are provided with the mating end pieces 23 and 24, which may serve as a mounting for the usual temple bars, and the end piece 24 in this instance is formed with a tubular extension 25 which is snugly received in the bore 26 of the end piece 23, the extension and end piece 24 being provided with a threaded bore 27 for receiving the threaded shank 28 of the retaining screw which is provided with the usual kerfed head 29, in the present instance shown as countersunk in the rabbeted portion 30. In this instance, the extension 25 is of lesser length than the bore 26 so as to permit the screw to fully draw the two end pieces and the ends of the eye-wire into contacting relation.

As previously stated, this form of joint has many advantages over the ordinary form of butt joint, in that it affords means to permit of a screw threaded engagement of greater length than the butt joint, relieves the retaining screw of a considerable proportion of the stresses and strains which would otherwise obtain, while the extension acts as an aligning guide to facilitate the circumferential contraction and expansion of the eye-wire when emplacing or removing the lens.

Referring to the form of the invention illustrated in Figures 5 and 6 of the drawing, 31 and 32 designate respectively the opposite ends of the eye-wire of the Oxford frame, which in this instance is provided with screw tube joint sections 33 and 34, the latter having formed integral therewith a spring casing 35, the peripheral wall of which is open as at 36 to receive the spring and one wall of which opening 36 is formed with a notch 37 for the reception of one terminal 38 of the spring 39, the opposite terminal 40 being designed to engage within the bridge spring knuckle (not shown). The screw tube joint section 33 has a closed outer end 41 and is formed at its inner end with an extension 42 of reduced diameter, the section 41 and extension 42 having a continuous internally threaded bore 43. The section 34 has its inner end recessed as at 44 to receive the extension 42, and said recess communicates with a non-threaded bore 45 which freely receives the threaded shank 46 of the retaining screw. The bore 45 communicates with a recess 47 which opens into the spring casing 35 and receives the head 48 of the retaining screw which is inserted through the casing 35, after which the spring 39 is emplaced to act as a retaining means for preventing movement of the screw after the eye-wire has been contracted around the lens.

While there have been illustrated and described several preferred forms of the invention, no limitation is necessarily intended to the precise structural details except as restricted by the appended claims.

What is claimed is:

1. In an ophthalmic mounting, a joint for the ends of the eye-wires of spring bridge Oxford frames including mating screw receiving elements carried by the opposite ends of the eye-wire, one of said elements having a closed outer end and an extension at the inner end telescopically fitting within the inner end of the other element, said other element having a bridge spring casing at the outer end and a bore opening into the spring casing for receiving a retaining screw.

2. In an ophthalmic mounting, a joint for the ends of the eye-wires of spring bridge Oxford frames including mating screw receiving elements carried by the opposite ends of the eye-wire, one of said elements having a closed outer end and an extension at the inner end telescopically fitting within the inner end of the other element, said other element having a bridge spring casing at the outer end and a bore opening into the coiled bridge spring casing for receiving a retaining screw and a spring arranged within the spring casing adapted to bear against the screw head for retaining said screw against displacement.

JACOB J. POMERANZ.
VINCENT TANASSO.